US011777570B2

United States Patent
Kong et al.

(10) Patent No.: US 11,777,570 B2
(45) Date of Patent: Oct. 3, 2023

(54) SIMULTANEOUS BEAMFORMING AND NULLFORMING FOR SECURE WIRELESS COMMUNICATIONS

(71) Applicant: U.S. Army Combat Capabilities Development Command, Army Research Laboratory, Adelphi, MD (US)

(72) Inventors: Justin S. Kong, Clarksville, MD (US); Fikadu T. Dagefu, Silver Spring, MD (US); Brian M. Sadler, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 232 days.

(21) Appl. No.: 17/308,498

(22) Filed: May 5, 2021

(65) Prior Publication Data

US 2023/0125162 A1    Apr. 27, 2023

(51) Int. Cl.
*H04L 1/02*    (2006.01)
*H04B 7/06*    (2006.01)

(52) U.S. Cl.
CPC ......... *H04B 7/0617* (2013.01); *H04B 7/0632* (2013.01)

(58) Field of Classification Search
CPC ... H04W 76/40; H04W 72/046; H04W 72/08; H04W 16/28; H04W 16/14; H04W 72/54; H04B 7/0617; H04B 7/456; H04B 7/0632; H04L 43/50; H04L 25/228
USPC ....................................... 375/267, 260, 262
See application file for complete search history.

(56) References Cited

U.S. PATENT DOCUMENTS

| 7,006,039 | B2 | 2/2006 | Miyamoto et al. |
| 2013/0244594 | A1* | 9/2013 | Alrabadi ............... H04B 7/0413 455/78 |
| 2017/0194704 | A1* | 7/2017 | Chawgo ............... H01Q 19/108 |
| 2018/0084555 | A1* | 3/2018 | Mori ................. H04W 74/0816 |
| 2020/0244564 | A1* | 7/2020 | Naseef .................. H04W 16/28 |

(Continued)

FOREIGN PATENT DOCUMENTS

WO    WO 2019/051079 A1    3/2019

OTHER PUBLICATIONS

R. Mudumbai et al., "Distributed Transmit Beamforming Using Feedback Control", IEEE Transactions on Information Theory, vol. 56, No. 1, Jan. 2010, 16 pgs.

(Continued)

*Primary Examiner* — Khai Tran
(74) *Attorney, Agent, or Firm* — Eric B. Compton (57) ABSTRACT

Systems and methods for wireless communications comprising a plurality of agents, which together as the group, are configured to: (i) wirelessly broadcast an interference signal by forming a radiation pattern having null vectored substantially toward a client; (ii) wirelessly transmit a communication signal to the client by forming a radiation beam carrying the communication signal vectored substantially toward the client; and (iii) wirelessly broadcast a combined communication signal and interference signal to the client using phases of processes (i) and (ii). In some embodiments, the agents together as a group may be further configured to: allocate and adjust power for performing processes (i) and (ii) at substantially the same time.

28 Claims, 7 Drawing Sheets

(56) References Cited

U.S. PATENT DOCUMENTS

2020/0333431 A1* 10/2020 Völkel .................. G01S 13/426
2021/0216893 A1*  7/2021 Roden ..................... G06N 5/04
2023/0010083 A1*  1/2023 Mungara ............. H04B 7/0626

OTHER PUBLICATIONS

Justin Kong, Fikadu T. Dagefu, and Brian M. Sadler, "Distributed Beamforming in the Presence of Adversaries," IEEE Transactions on Vehicular Technology (Early Access). Jun. 10, 2020.

Justin Kong, Fikadu T. Dagefu, and Brian M. Sadler, "Distributed Adaptive Beamforming and Nullforming for Covert Wireless Communications," presented at the IEEE VTC2019-Fall conference on Sep. 25, 2019. This paper was later published in proceeding of IEEE VTC2019-Fall on Nov. 7, 2019.

J. Kong, F. T. Dagefu, and B. M. Sadler, "Simultaneous Beamforming and Nullforming for Covert Wireless Communications," in Proceedings of IEEE Vehicular Technology Conference, May 25-Jul. 31, 2020.

E. K. P. Chong and S. H. Zak, *Introduction to optimization.* 4th ed. Hoboken, NY, USA: Wiley, 2013, p. 116.

U.S. Appl. No. 63/081,653, filed Sep. 22, 2020 titled "Distributed Adaptive Beamforming and Nullforming for Secure Wireless Communications".

U.S. Appl. No. 17/205,355, filed Mar. 18, 2021 titled "Distributed Adaptive Beamforming and Nullforming for Secure Wireless Communications".

\* cited by examiner

SIMULTANEOUS BEAMFORMING AND NULLFORMING FOR SECURE WIRELESS COMMUNICATIONS

GOVERNMENT INTEREST

The invention described herein may be manufactured, used, and licensed by or for the United States Government. Some research underlying the invention was sponsored in-part by the CCDC Army Research Laboratory under Cooperative Agreement Number W911NF-19-2-0101.

RELATED APPLICATION AND PUBLICATION

This application relates to commonly-owned U.S. patent application Ser. No. 17/205,355, filed Mar. 18, 2021, the disclosure of which is herein incorporated by reference in its entirety.

Moreover, aspects of this invention have been previous disclosed by the inventors in the paper by J. Kong, F. T. Dagefu, and B. M. Sadler, "Simultaneous Beamforming and Nullforming for Covert Wireless Communications," in the Proceedings of IEEE Vehicular Technology Conference, May 25-Jul. 31, 2020, which is hereby incorporated by reference in its entirety.

BACKGROUND

I. Field

This application relates generally to radio frequency (RF) communications, and more particularly, to systems and methodologies for simultaneous beamforming and nullforming for secure wireless communications.

II. Description of Related Art

Unlike well-founded cellular networks, many communications environments are highly dynamic and infrastructure-poor, and hence coordination among transceivers, information about channels between transceivers, and knowledge of potential adversaries using communications intercepting receivers is generally very limited. In addition, potential adversaries use devices that are often passive and conceal their presence, and therefore the legitimate transceivers have no knowledge about the adversary device locations or capabilities. Conventional distributed beamforming methods do not consider security issues or assume that the legitimate users have knowledge about potential adversaries.

Instead, many conventional methods in distributed beamforming networks consider one of two scenarios: (1) maximizing the data rate achieved at a client device (i.e., a legitimate user device) without consideration of potential adversaries, and (2) supporting the client device while alleviating the signals to unintended receivers by utilizing the channel information of the client device and unintended receivers.

These approaches may also result in sidelobes that radiate significant energy to unintended directions. This in turn makes the wireless link vulnerable to eavesdropping and may cause interference at unintended receivers. In an effort to control sidelobe magnitude, transmit power control algorithms have been developed to reduce the peak sidelobe level. Also, a power and phase optimization strategy has been proposed with two objective functions, i.e., peak sidelobe level minimization and directivity maximization. However, these techniques did not take phases of fading channels into account and they were based on the assumption that each agent transmitter has a priori knowledge of the locations of and directions toward all user transceivers.

The aforementioned U.S. patent application Ser. No. 17/205,355 patent application discloses a system and method for distributed wireless communications which divides a plurality of agents into two groups with the aim of one or more agents in a first group transmitting a confidential message to the client while the agents in the second group radiate artificial interference to confuse potential adversaries. However, the prior invention may require a larger number of feedback iterations due to the iterative group formation process in the prior invention.

SUMMARY

Embodiments of the invention provide systems and methodologies for distributed wireless communications. More particularly, they provide systems and methodologies for simultaneous beamforming and nullforming for secure wireless communications.

Simultaneous beamforming and nullforming enhance throughput of data to a client device and disrupt the ability of an adversary to use a receiver to intercept the transmission to a client device. Such beamforming and nullforming is performed by a plurality of agent devices, which together as a group, transmit without a priori knowledge of the locations of each of the agent devices, the client device and/or any adversary devices attempting to intercept the transmission to the client device from one or more of the agent devices. The agent devices, as a group, create a data-carrying beam directed at the client device while also producing a null in signal strength of a noise carrying signal that is intended to disrupt reception at adversary locations of the data carrying signal.

According to one embodiment, a system for distributed wireless communications includes: a plurality of agents, which together as the group, are configured to: (i) wirelessly broadcast an interference signal by forming a radiation pattern having null vectored substantially toward a client; (ii) wirelessly transmit a communication signal to the client by forming a radiation beam carrying the communication signal vectored substantially toward the client; and (iii) wirelessly broadcast a combined communication signal and interference signal to the client using phases of processes (i) and (ii).

To perform process (i), the agents together as the group may be configured to adjust phases of the transmitted interference signals resulting in the interference signal transmitted by the agents in the group cancelling each other at the client. The agents receive at least one client communication signal transmitted from the client comprising feedback information based on the client's received interference-to-noise-ratio (INR), and in response, the agents adjust the phases of the interference signals. And, the agents repeat phase adjustments until a Quality of Service (QoS) constraint of the client is satisfied or achieving a predetermined number of adjusting iterations.

To perform process (ii), the agents together as the group may be configured to adjust phases of the transmitted communication signals resulting in the communication signal transmitted by the agents in the group constructively combining at the client. The agents receive at least one client communication signal transmitted from the client comprising feedback information based on the client's received signal-to-interference-plus-noise-ratio (SINR) or signal-to-noise-ratio (SNR) and, in response, the agents adjust the phases of the transmitted communication signals. And, the agents repeat phase adjustments until a Quality of Service (QoS) constraint of the client is satisfied or achieving a predetermined number of adjusting iterations.

Preferably, the agents together as a group may be further configured to: allocate and adjust power for performing processes (i) and (ii) at substantially the same time. The agents receive at least one client communication signal transmitted from the client comprising feedback information based on the client's received signal-to-interference-plus-noise-ratio (SINR) and, in response, the agents adjust the power allocated for performing processes (i) and (ii). And the agents determine a value of power allocation that fulfills a Quality of Service (QoS) constraint of the client. The determination can be made using a bisection method, for example.

The client may be a part of the system in some embodiments and implementations. The client may periodically send client communication signals to the agents of the group comprising feedback information based on the client's received signal-to-interference-plus-noise-ratio (SINR), signal-to-noise ratio (SNR), or interference-to-noise-ratio (INR). The feedback information sent by the client preferably may comprise two bits. Upon receiving the feedback information, the agent respond as mentioned above.

According to another embodiment, a method for performing distributed wireless communications includes: (i) wirelessly broadcasting by a group of agents an interference signal by forming a radiation pattern having null vectored substantially toward a client; (ii) wirelessly transmitting by the group of agent a communication signal to the client by forming a radiation beam carrying the communication signal vectored substantially toward the client; and (iii) wirelessly broadcasting by the group of agents a combined communication signal and interference signal to the client using phases of processes (i) and (ii).

According to yet another embodiment, a non-transitory computer storage medium includes computer-executable instructions that, when executed by one or more processors residing in a group of agents, configure the group of agents to execute the aforementioned method.

These and other embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

DETAILED DESCRIPTION

Due to the increasing presence of adversaries and the threat they pose to both civilian and military communications networks, it is important to utilize sophisticated secure wireless communication techniques to improve data throughput to desired recipients and degrade the possibility of adversarial communication interception.

The following describes novel beamforming and nullforming systems and methodologies that create a directional (or vectored) link to a client device (e.g., a communications transceiver) or other entity while enhancing security against potential eavesdropping by communication devices (e.g., receivers) used by adversaries. In order to obfuscate the reception of signals by one or more adversaries without having any information about them or their locations, various embodiments utilize a number of transmitters (agents) to produce interference with the aim of preventing the adversaries from intercepting confidential messages.

More specifically, the novel systems and methodologies use the same agents, together as a group, to simultaneously transmit the confidential message and the artificial interference. Each agent transmitter sends a message to the client by first transmitting noise with null-steering to the client and then by steering a communication beam to the client so as to simultaneously transmit noise along with communication beam to the client. In addition, a power allocation strategy may be preferably executed in some embodiments that adjusts the allocated powers for beamforming and nullforming. A feedback scenario is presented, in which the client sends back communication signals including feedback information which is common to all agent transmitters. Preferably, this feedback information is 2-bits. Upon receiving the feedback information, the agents respond in many ways, as discussed in more detail herein.

The systems and methodologies do not require any information about potential adversaries and they can be performed in a fully distributed fashion, i.e., each agent transmitter identifies its phase without having the knowledge of the other transmitters locations and phase components.

Figure 1:
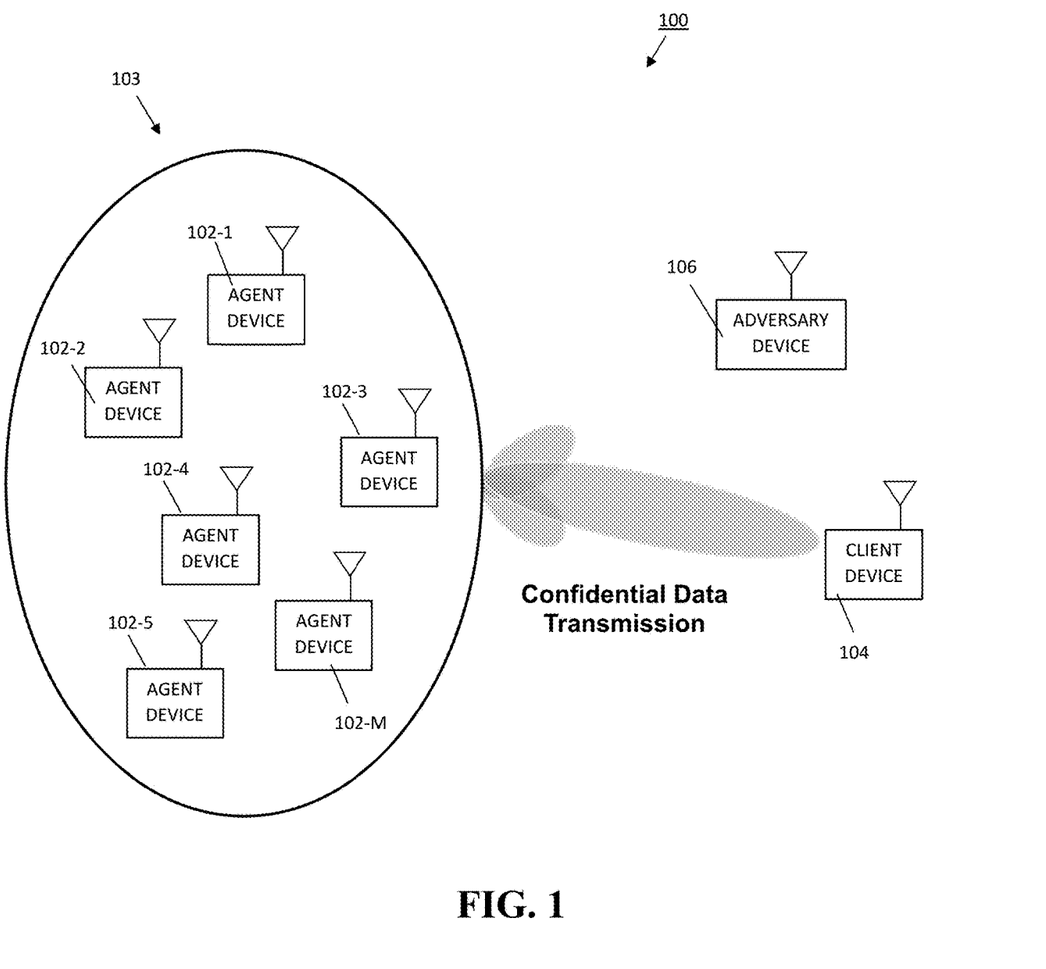
FIG. 1 is a block diagram of a wireless communication network comprised of a plurality of agent devices and at least one client device in accordance with at least one embodiment of the invention.

FIG. 1 is a block diagram of a wireless communication network 100 composed of a plurality of distributed agents 102-1, 102-2, 102-3, 102-4, 102-5 . . . 102-M (collectively, agents 102) arranged as a group 103 and at least one client 104 in accordance with at least one embodiment of the invention. The agents 102 and client 104 are geometrically separated from one another in two-dimensional (2D) space, as shown, or it could be three-dimensional (3D) space. In the depicted embodiment, the number of agents M is, for example, six, but could be as many as needed (no theoretical limit) or as few as two, in other embodiments. The client may be an individual (e.g., a soldier, warfighter, commercial user) equipped with or otherwise using a radio. While one client is depicted, there could be others. Potential adversaries, one of which is depicted as 106, may be located in a position to eavesdrop on RF communications between an agent 102 and the client 104. As mentioned above, potential adversaries 106 often utilize passive receiving devices and conceal their presence. They could be individuals with suitable RF devices or passive RF detectors sensors (also known as RF "sniffers" or "bugs"). Thus, their presence may not be known or detected by the agents 102 or client 104.

The agents 102-1 to 102-M are configured to both: (i) broadcast RF signals to interfere with one or more adversary devices (i.e., an adversary receiver referred herein as adversary or adversaries) and creates a null in the interfering signal that points in the direction of the client device, and (ii) transmit a radio frequency (RF) communication message to a client device (i.e., a client transceiver referred to herein as a client) and/or other agents. The first process (i) is referred to as "nullforming," herein. And the second process (ii) is referred to as "beamforming," herein. The agents may perform processes (i) and (ii) individually or simultaneously, at various times, in performing the novel methodologies described herein.

Each of the agents 102-1 to 102-M may preferably include an omni-directional antenna. This allows for controlled transmission and/or reception of RF signal about the azimuth direction in 2D space or the azimuth and elevation directions in 3D space. A RF signal is meant to include any radio frequency signal that through the use of multiple transmitters may form a radiation pattern comprising a radiation beam or null, including signals in spectrums such as ULF, UHF, VHF, millimeter wave, microwave, ultrasonic waves, and the like.

In one embodiment, one or more of the agents 102-1 to 102-M may be an autonomous vehicle, a mobile command station or an individual carrying a transceiver. While some agents 102 may be ground-based platforms, in other embodiments the agents may be air-borne and/or sea-borne platforms, or any combination of ground-, air- or sea-borne platforms. The agents may be equipped with cameras and microphones for providing image/video data and sound/voice data. Additionally, the agents may be equipped with various sensor(s) for providing other information. Some non-limiting examples of sensors may include: additional or multispectral imaging (UV/visible/IR); antennas (RF; radio); ranging (radar; LIDAR); location/position sensors (GPS, altitude/depth, etc.), motion sensors (speed/velocity, bearing/trajectory, acceleration, etc.); weather sensors (temperature, pressure, wind speed, ambient lighting, etc.); and field sensors (electric, magnetic, vibrations, radiation, biological, etc.). Of course, other sensors and sensor information may also be provided for as may be desirable.

Figure 2:
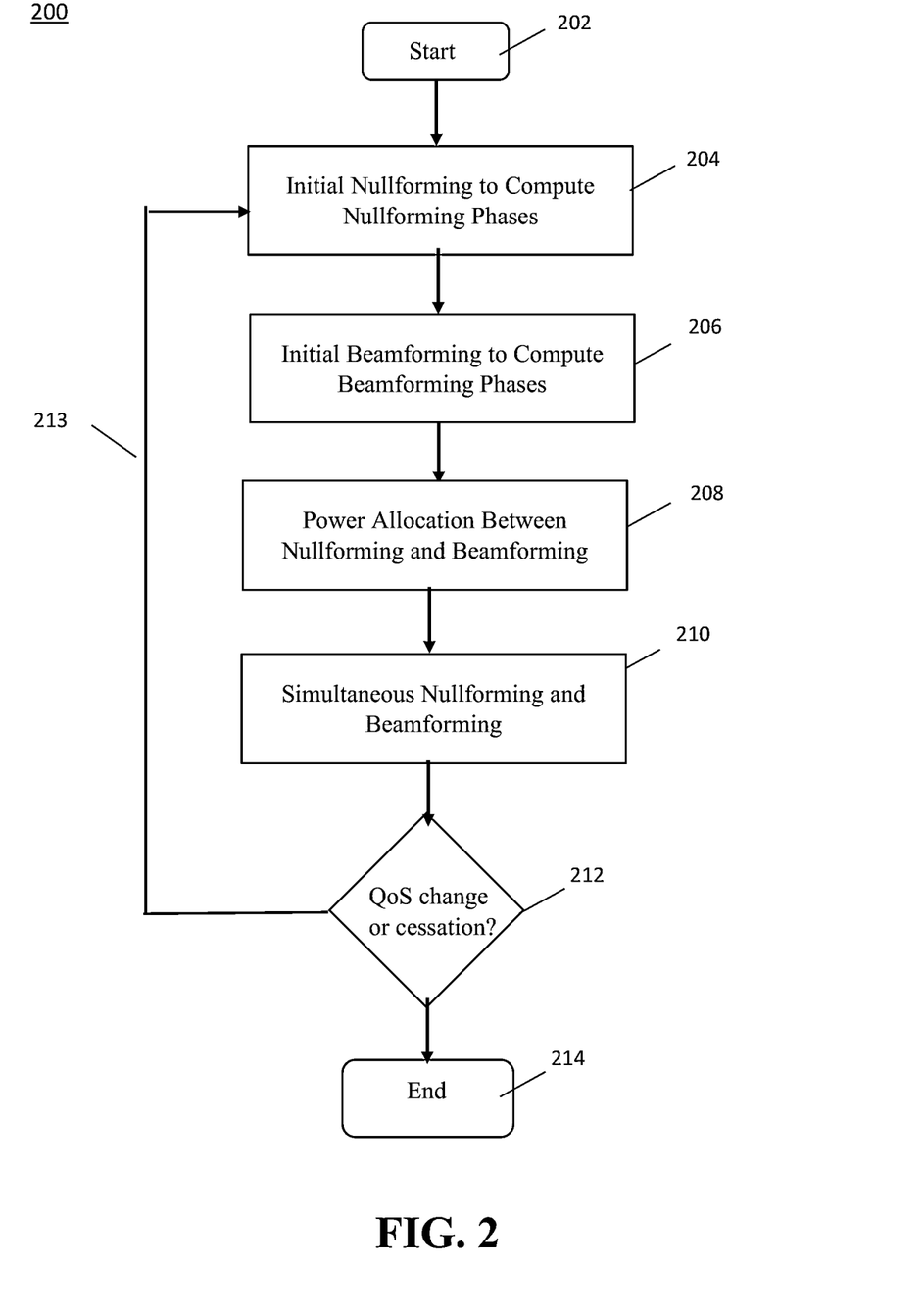
FIG. 2 is a flowchart of a secure communication method for use with the wireless network of FIG. 1 in accordance with at least one embodiment of the invention.

FIG. 2 is a flowchart a method 200 for performing distributed wireless communications for wireless networks (e.g., network 100 of FIG. 1) according to one or more embodiments of the invention. The method 200 begins at 202 and proceeds to 204 where the agents initially perform nullforming to compute nullforming phases.

A basic premise of this step of the methodology is that multiple distributed agents as a group need to adjust the phase components of their broadcasted signals with the aim of fulfilling the QoS requirement of the client without coordination among the agents. The lack of agent coordination, i.e., the agents do not communicate with one another, reduces latency and system overhead. Embodiments of the invention operate in a fully distributed manner with, in one embodiment, only two bits of feedback information from the client being transmitted to the agents and without any knowledge about potential adversaries. As such, the feedback information requires very little overhead in the communication signaling.

Nullforming relates to controlling aspects of the radio RF signals used by the agents and client. More specifically, the distributed agent transmitters in the group control their RF signal phase components in such a way that their signals substantially cancel each other at the client. Hence, they form a null in the direction towards the client. This results in the minimization of the signal strength at the client from the nullforming agents. To further confuse potential adversaries, the agents in performing "nullforming" may broadcast interference signals, e.g., noise or spoofing signals.

Continuing the method 200, at 204, the agents as a group, together wirelessly broadcast communication signal interference by forming a radiation pattern having null vectored substantially toward a client. The nullformed interference pattern is designed to confuse potential adversaries. Although the RF interference produced by the nullforming can obfuscate the adversaries, it may also unfortunately degrade the quality-of-service (QoS) of the client. Therefore, to alleviate the impact of the RF interference at the client, the group is configured to create a null substantially vectored towards the client only. In other words, the artificial RF interference is broadcast in various directions but not towards the client.

Here, the agents together as the group are configured to adjust phase components $\{\phi_{N,i}(t)\}$ of the transmitted communication signal interference resulting in the communication signal interference transmitted by the agents in the group cancelling each other at the client. The interference may be artificial (or white) noise. To control their phases, the agents receive at least one client communication signal transmitted from the client comprising feedback information based on the client's received interference-to-noise-ratio (INR), and in response, the agents adjust the phase of the communication signal interference. The agents repeat phase adjustments until a Quality of Service (QoS) constraint of the client is satisfied or achieving a predetermined number of adjusting iterations.

Once the phase components $\{\phi_{N,i}(t)\}$ for the group for nullforming is finally adjusted, the method proceeds to 206 where the agents initially perform beamforming to compute beamforming phases. Beamforming relates to controlling aspects of the radio RF signals used by the agents and client. More particularly, beamforming is cooperative communication in which distributed agent transmitters in the beamforming group control the phases of their RF signals in a way that the signals are constructively combined at a client. As such, the signal strength at the client from the beamforming agents is maximized.

The method 200, at 206, the agents as a group, together wirelessly transmit a communication signal to the client by forming a radiation beam carrying the communication signal vectored substantially toward the client. In one exemplary use case, the agents would be unmanned ground and/or aerial vehicles which are low size, weight, power and cost (SWaP-C) and each agent is equipped with the appropriate radio and antenna element. These mobile agents are then deployed to carry out specific tasks in a distributed or collaborative fashion and the information that is gathered need to be shared to a client that is further away (e.g., command post). In this use case, each agent will not have enough power to transmit the critical information on their own. The agents could then coordinate their transmitted signal phases to enhance the communication signal to enable the transmission of confidential message to the client. The communication signal may be any analog or digital communication signal. Here, the agents together as the group adjust phase components $\{\phi_{B,i}(t)\}$ of the transmitted communication resulting in the communication signals transmitted by the agents in the group constructively combining at the client. To control their phases, the agents receive at least one client communication signal transmitted from the client comprising feedback information based on the client's received signal-to-interference-plus-noise-ratio (SINR) or signal-to-noise-ratio (SNR) and, in response, the agents adjust the phase of the transmitted communications signal. In the initial beamforming process, the interference power is or very close to zero. The SINR is therefore the same or substantially the same as the SNR. Thus, the SINR and SNR may be treated as interchangeable here. The agents repeat phase adjustments until a Quality of Service (QoS) constraint of the client is satisfied or achieving a predetermined number of adjusting iterations.

Once the phase components $\{\phi P_{B,i}(t)\}$ for the group for beamforming is finally adjusted, the method proceeds to 208 where the method allocates power between nullforming and beamforming processed.

It is noted that the order of steps 204 or 206 may be reversed from that shown in FIG. 2. That is, beamforming may proceed nullforming in certain embodiments and implementations.

At 208, the agents together as a group allocate and adjust power for performing processes the aforementioned nullforming and beamforming at substantially the same time (i.e., simultaneously). Here, the agents receive at least one client communication signal transmitted from the client comprising feedback information based on the client's received signal-to-interference-plus-noise-ratio (SINR) and, in response, the agents adjusts the power allocated for performing the nullforming and beamforming processes. For instance, the method here may compute the power $\alpha(t)$ for nullforming. So the power for beamforming is $\phi_{B,i}(t)=\sqrt{P}(-\sqrt{\alpha(t)}\tau_i(t)+\sqrt{\alpha(t)(\tau_i(t))^2+1-\alpha(t)}$ for i=1, ..., M, where P is the total transmit power at all agent transmitters. Here $\Sigma_i(t)= \Re(e^{j(\phi_{B,i}(t)+\phi_C-\phi_{N,i}(t)-\phi_N)})$ where $\phi_C$ and $\phi_N$ respectively denote the phases of a confidential message and artificial interference.), or vice versa. The agents determine a value of power allocation that fulfills a QoS constraint of the client. The determination may be made using a bisection method, for instance. While executing process 208 in method 200 is ideal and thus preferred, this process step could be skipped or dispensed with altogether in some embodiments or implementations.

The method 200 processed to 210 to perform simultaneous nullforming and beamforming. The phases $\{\phi_{N,i}(t)\}$ and $\{\phi_{B,i}(t)\}$ for initial nullforming and initial beamforming, respectively, earlier adjusted in 204 and 206 are used in process 210. The agents as a group in 210 thus wirelessly broadcast a combined communication signal and communication signal interference to the client. And, by allocating power between these two processes, if earlier determined in 208, the two components of the combined communication signal and interference signal can be optimized without any further adjustment of phase components at all agent transmitters. The agents all use the same communication signal here. A combined communication signal and communication signal interference to the client may be sent from the agents to the client intermittently or continuously. The communication signal portion of the combined RF sent by the agents can change in 210, as may desired or otherwise needed.

At 212, a determination is made to update or cease the secure messaging by simultaneous nullforming and beamforming. For instance, the achieved SINR at the client may change when the channels to the client are time-varying. If the channels to the client are slightly changed, the SINR at the client may not be significantly affected. On the other hand, if the channels are significantly changed, the QoS requirement of the client may not be satisfied. In this case, the method proceeds along path 213 back to 204 so as to obtain a new set of nullforming phase components $\{\phi_{N,i}(t)\}$, beamforming phase components $\{\phi_{B,i}(t)\}$, and power allocation $\alpha(t)$ by re-performing the first three stages of the method 200. If cessation is desired, the method 200 proceeds to the end 214.

A basic premise of this methodology is that multiple distributed agents need to adjust the phase components of their broadcasted signals with the aim of fulfilling the QoS requirement of the client without coordination among the agents. The lack of agent coordination, i.e., the agents do not need to communicate with one another, reduces latency and system overhead. Embodiments of the invention operate in a fully distributed manner with, in one embodiment, only two bits of feedback information from the client being transmitted to the agents and without any knowledge about potential adversaries. As such, the feedback information requires very little overhead in the communication signaling.

The following detailed description of the invention uses various notations and equations to describe the operation of the invention. Table 1 below lists a definition for each of the notations used below.

TABLE 1

LIST OF NOTATIONS

| Notation | Definition |
| --- | --- |
| M | Number of distributed transmitters |
| P | Transmit power at all transmitters |
| $\emptyset_{N,i}(t)$ | Nullforming phase component of transmitter i |
| $\emptyset_{B,i}(t)$ | Beamforming phase component of transmitter i |
| $h_{C,i}$ | Gain of the channel between transmitter i and the client |
| $h_{A,i}$ | Gain of the channel between transmitter i and the adversary |
| $\theta_{C,i}$ | Phase of the channel between transmitter i and the client |
| $\theta_{A,i}$ | Phase of the channel between transmitter i and the adversary |
| $s_C$ | Confidential message |
| $s_N$ | Artificial interference |
| $\alpha(t)$ | Power portion for nullforming |
| $\gamma_C(\gamma_A)$ | SINR at the client (adversary) |
| $\sigma_C^2(\sigma_A^2)$ | Power of AWGN at the client (adversary) |
| $\xi_C$ | INR at the client |
| $\gamma_C^{target}$ | Target SINR |
| $\xi_C^{target}$ | Target INR |
| $\mathcal{F}$ | Two bits of feedback information |
| $\Delta$ | Magnitude of phase perturbation |
| $\mathcal{M}$ | Uniform distribution |
| $N_N$ | Parameter for the stopping criteria in nullforming |
| $N_B$ | Parameter for the stopping criteria in beamforming |
| $\nu$ | Parameter for the stopping criteria in power allocation |
| $\zeta$ | Parameter for the QoS in beamforming |

The signal processing used to implement the method 200 is described in further detail below. In addition, the following is a pseudocode representation (Pseudocode 1) of method 200:

1. Initialize t = 1 and $\phi_{N,i}(0) = 0$ for $\forall i \in \vartheta$.
   Set $\xi_C^* = \infty$, $\gamma_C^* = 0$, $n_N = n_B = 0$, $\alpha_l = 0$, and $\alpha_u = 1$.
2. Nullforming
   a. For $\forall i$, $\phi_{N,i}(t) = \phi_{N,i}(t-1) + \delta_i$ where $\delta_i$ follows $\mathcal{M}$.
   b. Transmitters send signals to the client by using $\{\phi_{N,i}(t)\}$ and setting $\phi_{B,i}(t) = 0$ for $\forall i$.
   c. The client measures $\xi_C(t)$ in equation (6).
   d. If $\xi_C(t) \leq \xi_C^{target}$ or $n_N = N_N$, the client feeds back $\mathcal{F} = (1, 1)$. Set $t = t + 1$ and go to Step 3.
   e. If $\xi_C(t) < \xi_C^*$, the client feeds back $\mathcal{F} = (0, 0)$.
      Set $\xi_C^* = \xi_C(t)$, $n_N = 0$ and $t = t + 1$.
   f. If $\xi_C(t) \geq \xi_C^*$, the client feeds back $\mathcal{F} = (0, 1)$.
      Set $\phi_{N,i}(t) = \phi_{N,i}(t-1)$, $n_N = n_N + 1$ and $t = t + 1$.
   g. Go to Step 2-a.
3. Beamforming
   a. For $\forall i$, $\phi_{B,i}(t) = \phi_{B,i}(t-1) + \delta_i$ where $\delta_i$ follows $\mathcal{M}$.
   b. Transmitters send signals to the client by using $\{\phi_{B,i}(t)\}$ and setting $\phi_{N,i}(t) = 0$ for $\forall i$.
   c. The client measures $\gamma_C(t)$ in equation (4).
   d. If $\gamma_C(t) \geq \zeta \gamma_C^{target}$ or $n_B = N_B$, the client feeds back $\mathcal{F} = (1, 1)$. Set $t = t + 1$ and go to Step 4.
   e. If $\gamma_C(t) > \gamma_C^*$, the client feeds back $\mathcal{F} = (0, 0)$.
      Set $\gamma_C^* = \gamma_C(t)$, $n_B = 0$ and $t = t + 1$.
   f. If $\gamma_C(t) \leq \gamma_C^*$, the client feeds back $\mathcal{F} = (0, 1)$.
      Set $\phi_{B,i}(t) = \phi_{B,i}(t-1)$, $n_B = n_B + 1$ and $t = t + 1$.
   g. Go to Step 3-a.
4. Power allocation
   a. Transmitters send signal with $\alpha(t) = (\alpha_l + \alpha_u)/2$.
   b. The client measures $\gamma_C(t)$ in equation (4).
   c. If $|\gamma_C(t) - \gamma_C^{target}|/\gamma_C^{target} < \nu$, the client feeds back $\mathcal{F} = (1, 1)$. Transmitters do not alter the obtained $\alpha(t)$.
   d. If $\gamma_C(t) < \gamma_C^{target}$, the client feeds back $\mathcal{F} = (0, 0)$.
      Set $\alpha_l = \alpha(t)$ and go to Step 4-a.
   e. If $\gamma_C(t) < \gamma_C^{target}$, the client feeds back $\mathcal{F} = (0, 1)$.
      Set $\alpha_u = a(t)$ and go to Step 4-a.

We now explain the Pseudocode 1. The operations executed in Step 1 simply initialize the various counters and processes operators use by method 200. The mathematical processing used and underlying meaning is as follows:

Denoting the transmit signal at agent i in time t by $x_i(t)$, the received signal at the client 104 from agent i (e.g., 102-1, 102-2, 102-3 . . . or 102-M) is given by:

$$r_{C,i}(t) = h_{C,i} e^{j\theta_{C,i}} x_i(t), \quad (1)$$

where $h_{C,i}$ and $\theta_{C,i}$ respectively denote the gain and phase of the channel between agent i and the client. Also, the received signal at a potential adversary 106 from agent i in time t is expressed as:

$$r_{A,i}(t) = h_{A,i} e^{j\theta_{A,i}} x_i(t), \quad (2)$$

where $h_{A,i}$ and $\theta_{A,i}$ represent the gain and phase of the channel between agent i and the adversary, respectively.

In considering the network 100 as a whole, the received signal at the client 104 from all agents 102-1 to 102-M in time t is given by:

$$r_C(t) = \Sigma_{i=1}^M h_{C,i} e^{j\theta_{C,i}} x_i(t) + n_C(t), \quad (3)$$

where $h_{C,i}$ and $\theta_{C,i}$ respectively denote the gain and phase of the channel between agent i and the client 104. Here, $n_C(t)$ is additive white Gaussian noise (AWGN) at the client. Also, the received signal at a potential adversary 106 from all agents 102-1 to 102-M in time t is expressed as:

$$r_A(t) = \Sigma_{i=1}^M h_{A,i} e^{j\theta_{A,i}} x_i(t) + n_A(t), \quad (4)$$

where $h_{A,i}$ and $\theta_{A,i}$ represent the gain and phase of the channel between agent i and the adversary, respectively, and $n_A(t)$ is AWGN at the adversary.

In this methodology, each agent simultaneously transmits a confidential message $s_C$ and radiates artificial interference $s_N$ where $|s_C|^2 = 1$ and $|s_N|^2 = 1$. In order to enhance the data rate at the client, all agents form a beam towards the client by adjusting the phase components for the confidential message transmission, $\{\phi_{B,i}(t)\}$, i.e., $\phi_{B,1}(t)$, $\phi_{B,2}(t)$, . . . $\phi_{B,M}(t)$. Also, in order to minimize the impact of interference at the client, all agents 102-1 to 102-M place a null to the client 104 by controlling the phase components for interference radiation $\{\phi_{N,i}(t)\}$, i.e., $\phi_{N,1}(t), \phi_{N,2}(t)$, . . . , $\phi_{N,M}(t)$.

Then, the transmit signal at agent i in time t is given by:

$$x_i(t) = \sqrt{P_{B,i}(t)} e^{j\phi_{B,i}(t)} s_C + \sqrt{\alpha(t) P} e^{j\phi_{N,i}(t)} s_N, \quad (5)$$

where $\alpha(t) \in [0,1]$ is the power portion for nullforming and $P_{B,i}(t)$ denotes the power for beamforming which satisfies the transmit power constraint $|x_i(t)|^2 = P$ for a given $\alpha(t)$ where P is the transmit power at all agents 102-1 to 102-M.

Based on this setup, the signal-to-noise-plus-interference ratio (SINR) at the client 104 is expressed as:

$$\gamma_C(t) = \frac{\left|\sum_{i=1}^M \sqrt{P_{B,i}(t)} h_{C,i} e^{j(\theta_{C,i} + \phi_{B,i}(t))}\right|^2}{\left|\sum_{i=1}^M \sqrt{\alpha(t) P} h_{C,i} e^{j(\theta_{C,i} + \phi_{N,i}(t))}\right| + \sigma_C^2}, \quad (6)$$

where $\sigma_C^2$ stands for the variance of AWGN at the client. Similarly, the SINR at the adversary 106 is given by:

$$\gamma_A(t) = \frac{\left|\sum_{i=1}^M \sqrt{P_{B,i}(t)} h_{A,i} e^{j(\theta_{A,i} + \phi_{B,i}(t))}\right|^2}{\left|\sum_{i=1}^M \sqrt{\alpha(t) P} h_{A,i} e^{j(\theta_{A,i} + \phi_{N,i}(t))}\right|^2 + \sigma_A^2}, \quad (7)$$

where $\sigma_A^2$ is the AWGN variance at the adversary.

The goal of the method is to identify the phase components at all agents ($\phi_{B,1}(t)$, $\phi_{B,2}(t)$, . . . , $\phi_{B,M}(t)$, $\phi_{N,1}(t)$, $\phi_{N,2}(t)$, . . . , $\phi_{N,M}(t)$) and the power portion for artificial interference radiation $\alpha(t)$ that satisfy the QoS constraint of the client ($\gamma_C(t) = \gamma_C^{target}$) while preventing the adversary from intercepting the confidential message where $\gamma_C^{target}$ is a target SINR.

It may be assumed that all agents do not know their channels to the client ($\{h_{C,i}\}_{i=1,\ldots,M}$ and $\{\theta_{C,i}\}_{i=1,\ldots,M}$) and the adversary ($\{h_{A,i}\}_{i=1,\ldots,M}$ and $\{\theta_{A,i}\}_{i=1,\ldots,M}$).

This method 200 is composed of various processes as illustrated in FIG. 2. In the initial nullforming process 204, all agents 102-1 to 102-M in the group 103 find their nullforming phases $\{\phi_{N,i}(t)\}$, i.e., $\phi_{N,1}(t), \phi_{N,2}(t), \ldots \phi_{N,M}(t)$ based on iterative feedback information included in a communication signal sent from the client. The feedback information preferably is 2-bits common to all agents. The feedback for this step is discussed in further detail below. More specifically, the aim of the nullforming process is to minimize the interference-to-noise ratio (INR) at the client using transmit power P where the INR at the client $\xi_C(t)$ is defined as:

$$\xi_C(t) = \frac{\left|\sum_{i=1}^M \sqrt{P} h_{C,i} e^{j(\theta_{C,i} + \phi_{N,i}(t))}\right|^2}{\sigma_C^2}. \quad (8)$$

The nullforming phases ($\phi_{N,1}(t), \phi_{N,2}(t), \ldots, \phi_{N,M}(t)$) are determined so that the interference term in $\gamma_C(t)$ is minimized, and hence the influence of interference on $\gamma_C(t)$ is marginal. On the other hand, the interference may have a significant impact on the SINR at the adversary $\gamma_A(t)$ as they might be combined constructively at the adversary.

In the beamforming process 206, all agents obtain their beamforming phases $\{\phi_{B,i}(t)\}$, i.e., $\phi_{B,1}(t)$, $\phi_{B,2}(t)$, . . . , $\phi_{B,M}(t)$ based on iterative feedback information from the client with the goal of maximizing the SINR at the client $\gamma_C(t)$. The feedback information is included in a communication signal sent from the client. Preferably, the feedback information is 2-bits common to all agents. The feedback for this step is discussed in further detail below.

In the power allocation process 208, the power portion for interference radiation $\alpha(t)$ which meets $\gamma_C(t)=\gamma_C^{target}$ is determined based on iterative feedback information from the client. Preferably, the feedback information is 2-bits common to all agents. The feedback for this step is discussed in further detail below.

As mentioned above, aspects of the novel processing of method 200 involves the agents 102-1 to 102-M as a group 103. The agents are distributed and, to practice method 200, do not need to communication with one another. That is, each agent communications with the client 104. And the agents do not have or need to know any information about the adversaries to perform the novel methodology.

The agent transmitters send the confidential message by forming a beam to the client and radiate interference while creating a null towards the client.

In method 200, agent transmitters are configured to simultaneously send both the confidential message $s_C$ and artificial RF noise $s_N$ to prevent the potential adversary 106 from eavesdropping. However, without a proper phase adjustment, the noise interferes, with not only the adversary but also the client. The signal-to-noise-plus-interference ratio (SINR) at the client is given by:

$$\gamma_C(t) = \frac{\left|\sum_{i=1}^{M}\sqrt{P_{B,i}(t)}\,h_{C,i}e^{j(\theta_{C,i}+\phi_{B,i}(t))}\right|^2}{\left|\sum_{i=1}^{M}\sqrt{\alpha(t)P}\,h_{C,i}e^{j(\theta_{C,i}+\phi_{N,i}(t))}\right| + \sigma_C^2}, \quad (9)$$

where $\sigma_C^2$ stands for the power of additive white Gaussian noise (AWGN) at the client and $|s_C|^2=|s_N|^2=1$. Similarly, we express the SINR at the adversary as:

$$\gamma_A(t) = \frac{\left|\sum_{i=1}^{M}\sqrt{P_{B,i}(t)}\,h_{A,i}e^{j(\theta_{A,i}+\phi_{B,i}(t))}\right|^2}{\left|\sum_{i=1}^{M}\sqrt{\alpha(t)P}\,h_{A,i}e^{j(\theta_{A,i}+\phi_{N,i}(t))}\right|^2 + \sigma_A^2}, \quad (10)$$

where $\sigma_A^2$ is the AWGN power at the adversary.

The method 200 thus includes three processes 204, 206 and 208 ahead of simultaneous nullforming and beamforming process 210 as illustrated in FIG. 2. In brief, method 200 uses initial nullforming 204 to obtain null phases $\{\phi_{N,i}(t)\}$, initial beamforming 206 to obtain beam phases $\{\phi_{B,i}(t)\}$, and power allocation 208 to determine the power portion for nullforming $\alpha(t)$.

More specifically, in the initial nullforming process 204, the agent transmitters adjust their phase components $\{\phi_{N,i}(t)\}$ to minimize the interference-to-noise ratio (INR) at the client using transmit power P where the INR $\xi_C(t)$ is defined as:

$$\xi_C(t) = \frac{\left|\sum_{i=1}^{M}\sqrt{P}\,h_{C,i}e^{j(\theta_{C,i}+\phi_{N,i}(t))}\right|^2}{\sigma_C^2} \quad (11)$$

In the initial beamforming process 206, the phase components $\{\phi_{B,i}(t)\}$ are updated with the goal of maximizing the SINR $\gamma_C$ in Equation (9). Lastly, in the power allocation process 208, the power portion for nullforming $\alpha(t)$ which meets $\gamma_C=\gamma_C^{target}$ is determined.

Now, feedback scenarios for the initial nullforming 204, initial beamforming 206 and power allocation 208 will be discussed. The client 104 sends a communication signal to all of the agents 102-1 to 102-M including the feedback information. Preferably, feedback information for each of these three processes use two-bits of feedback data.

For instance, one of three 2-bit encodings (0, 0), (0, 1), and (1, 1) may be used. The client utilizes the feedback $\mathcal{F}=(0, 0)$ and (0, 1) to help transmitters control their phases or allocated power portions for initial nullforming or initial beamforming. The feedback information $\mathcal{F}=(1, 1)$ indicates that the current process is completed.

Steps 2 to 4 of Pseudocode 1, respectively, present the initial nullforming 204, initial beamforming 206 and power allocation processes 208 of method 200. Here, $\mathcal{M}$ is a uniform distribution with interval $[0, \Delta]$ and $\Delta$ denotes the magnitude of phase perturbation.

In the initial nullforming process 204, all agent transmitters determine the nullforming phases $\{\phi_{N,i}(t)\}$ to reduce the INR $\xi_C(t)$ in Equation (11). In time slot t, transmitters send signals employing randomly perturbed phase components $\{\phi_{N,i}(t)\}$ where $\phi_{N,i}\phi_{N,i}(t-1)+\delta_i$ where $\delta_i$ follows $\mathcal{M}$ while the beamforming phases $\{\phi_{B,i}(t)\}$ are set to 0. Then, the client measures the received INR $\xi_C(t)$ in Equation (11), and feeds back $\mathcal{F}=(0, 0)$ or (0, 1) depending on the relationship between $\xi_C(t)$ and the smallest achieved INR $\xi_C^*$. Once the transmitters receive feedback $\mathcal{F}$, they update their phases accordingly. This iterative process ends when the target INR is attained, i.e., $\xi_C(t) \leq \xi_C^{target}$, or the number of successive failures in achieving a lower INR $n_N$ becomes identical to a predefined number $N_N$. (The feedback used in Step 2 of Pseudocode 1 is depicted $\mathcal{F}_N$ in FIG. 3).

In the initial beamforming process 206 in Step 3 of Pseudocode 1, transmitters derive the beamforming phase components $\{\phi_{B,i}(t)\}$ which satisfy $\gamma_C(t) \geq \zeta \gamma_C^{target}$. Here, the scaling term, zeta, $\zeta$, is employed to achieve an SINR which is higher than $\gamma_C^{target}$ so that a portion of the power for beamforming can be utilized for nullforming in the power allocation stage. Typically, $\zeta$ will be greater than 1. If the target SINR is much lower than the maximum achievable SINR, one can set $\zeta$ to a high number as long as $\zeta$ times the target SINR is not larger than the maximum achievable SINR. On the other hand, if the target SINR is not small, one can set $\zeta$ to a small number so that $\zeta\gamma_C^{target}$ is not higher than the maximum achievable SINR. The idea of adjusting $\{\phi_{B,i}(t)\}$ in Step 3 is the essentially the same as that of finding $\{\phi_{N,i}(t)\}$ in Step 1 for initial nullforming, and therefore the detailed explanation of the beamforming stage is omitted for brevity. Like, in the previous step, iterative feedback is used. (This feedback used in Step 3 of Pseudocode 1 is depicted $\mathcal{F}_B$ in FIG. 4).

Before introducing the power allocation process 208, we examine the allocated power $P_{B,i}(t)$ for beamforming at an agent transmitter i. As the power budget at the transmitters is P, for a given $\alpha(t)$, we have:

$$|x_i(t)|^2 = P \Leftrightarrow |\sqrt{P_{B,i}(t)}e^{j\phi_{B,i}(t)}s_C + \sqrt{\alpha(t)P}e^{j\phi_{N,i}(t)}s_N|^2 = P \Leftrightarrow (P_{B,i}(t))^2 + 2\sqrt{\alpha(t)P}\tau_i(t)P_{B,i}(t) + \alpha(t)P - P = 0, \quad (12)$$

where $\tau_i(t) = \Re(e^{j(\phi_{B,i}(t)+\phi_C-\phi_{N,i}(t)-\phi_N)})$, and $\phi_C$ and $\phi_N$ respectively denote the phases of $s_C$ and $s_N$. Then, by solving the polynomial equation in (12) for $\forall i$, $P_{B,i}(t)$ is given by:

$$P_{B,i}(t) = \sqrt{P}(-\alpha(t)\tau_i(t) + \sqrt{\alpha(t)(\tau_i(t))^2 + 1 - \alpha(t)}) \quad (13)$$

Now, we explain the power allocation process 208 in Step 4 in Pseudocode 1 which identifies $\alpha(t)$ satisfying the QoS requirement of the client $\gamma_C=\gamma_C^{target}$ by calculating the beamforming powers $\{P_{B,i}(t)\}$ as in Equation (12). Note that the SINR $\gamma_C$ in Equation (13) is not a monotonic function of $\alpha(t)$ due to the complicated form of $P_{B,i}(t)$ in Equation (12). In this regard, there may exist multiple solutions of $\alpha(t)$ which meet the QoS requirement. By leveraging a bisection method, for instance, as in Step 4, one can always find a value of $\alpha(t)$ fulfilling $\gamma_C=\gamma_C^{target}$. One exemplary bisection method that may be used in various embodiments is described by E. K. P. Chong and S. H. Zak, *Introduction to optimization.* 4th ed. Hoboken, NY, USA: Wiley, 2013, page 116 herein incorporated by reference.

Figure 5:
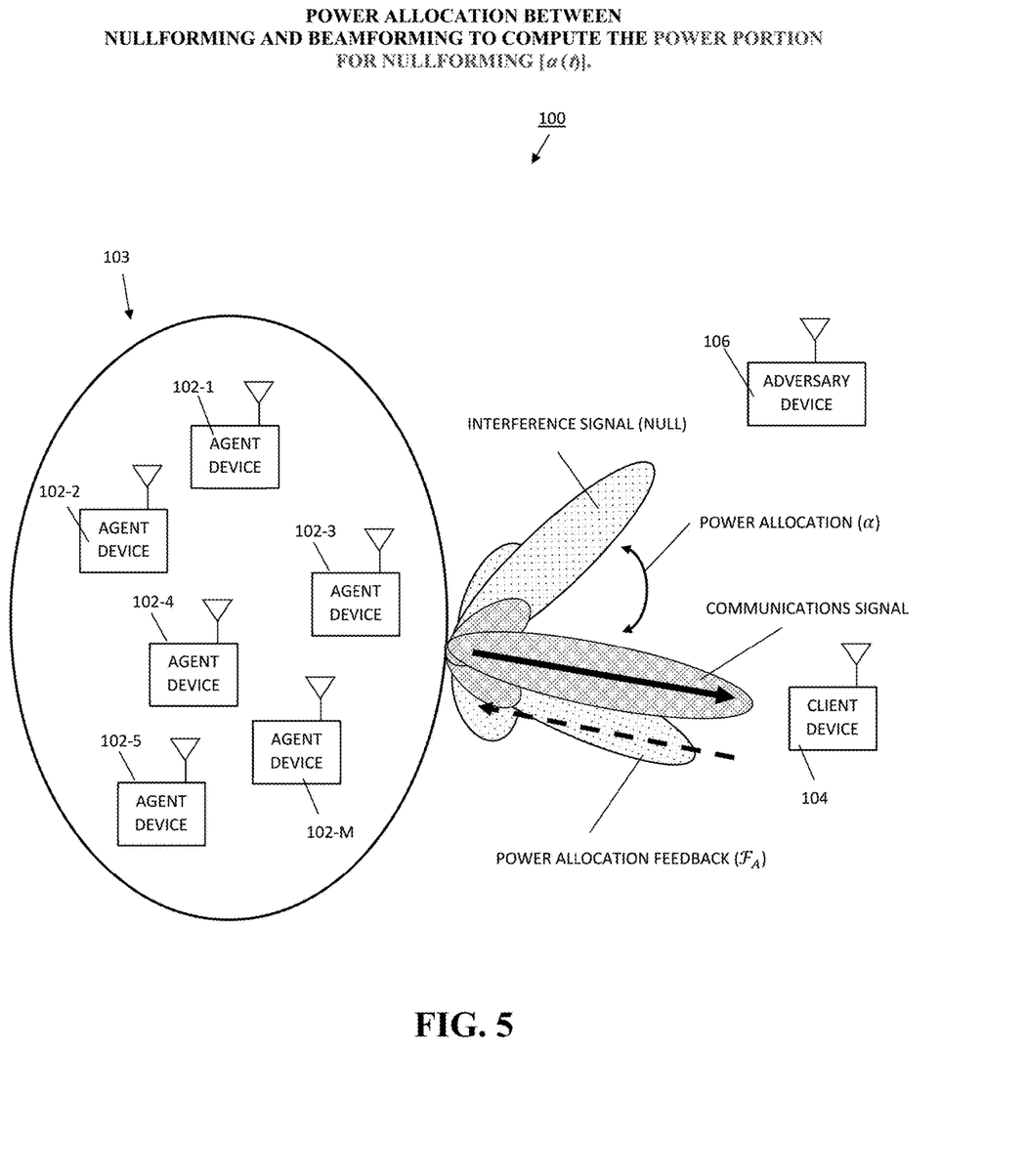
FIG. 5 depicts a block diagram of the network of FIG. 1 using the group of agents to perform a power allocation process in accordance with at least one embodiment.

In the exemplary set of feedback $\mathcal{F}$ used in the power allocation process, (1,1), (0,0) and (0,1), respectively, indicate that the client measured SINR $\gamma_C(t)$ is within a certain threshold of $\nu$, higher or lower than the target $\gamma_C^{target}$ Looking at Pseudocode 1, in the first case (4-c), the process computes the relative difference between the SINR $\gamma_C(t)$ and the target SINR threshold $\gamma_C^{target}$, as follows:

$$\frac{|\gamma_C(t) - \gamma_C^{target}|}{\gamma_C^{target}},$$

and compares it to an exemplary threshold parameter $\nu$ for stopping the bisection scheme. For instance, $\nu$ may be 0.01 or 1%. If the computed value is within that threshold $\nu$, the client sends feedback $\mathcal{F}=(1,1)$ to all agents. The agents, in response to receiving that client feedback, use the current $\alpha(t)$, and continue. In the second case (4-d), if the SINR $\gamma_C(t)$ is greater than the target $\gamma_C^{target}$ then the client sends feedback $\mathcal{F}=(0,0)$ to all agents. The agents, in response to receiving that client feedback, set $\alpha_l=\alpha(t)$, and go to Step 4-a to repeat the bisection method. And in the third case (4-e), if the SINR $\gamma_C(t)$ is less than the target $\gamma_C^{target}$, then the client sends feedback $\mathcal{F}=(0,1)$ to all the agents. And, the agents, in response to receiving that client feedback, set $\alpha_u=\alpha(t)$, and go to Step 4-a to repeat the bisection method. (The feedback used in Step 4 of the Pseudocode 1 is depicted as $\mathcal{F}_A$ in FIG. 5).

Figure 3:
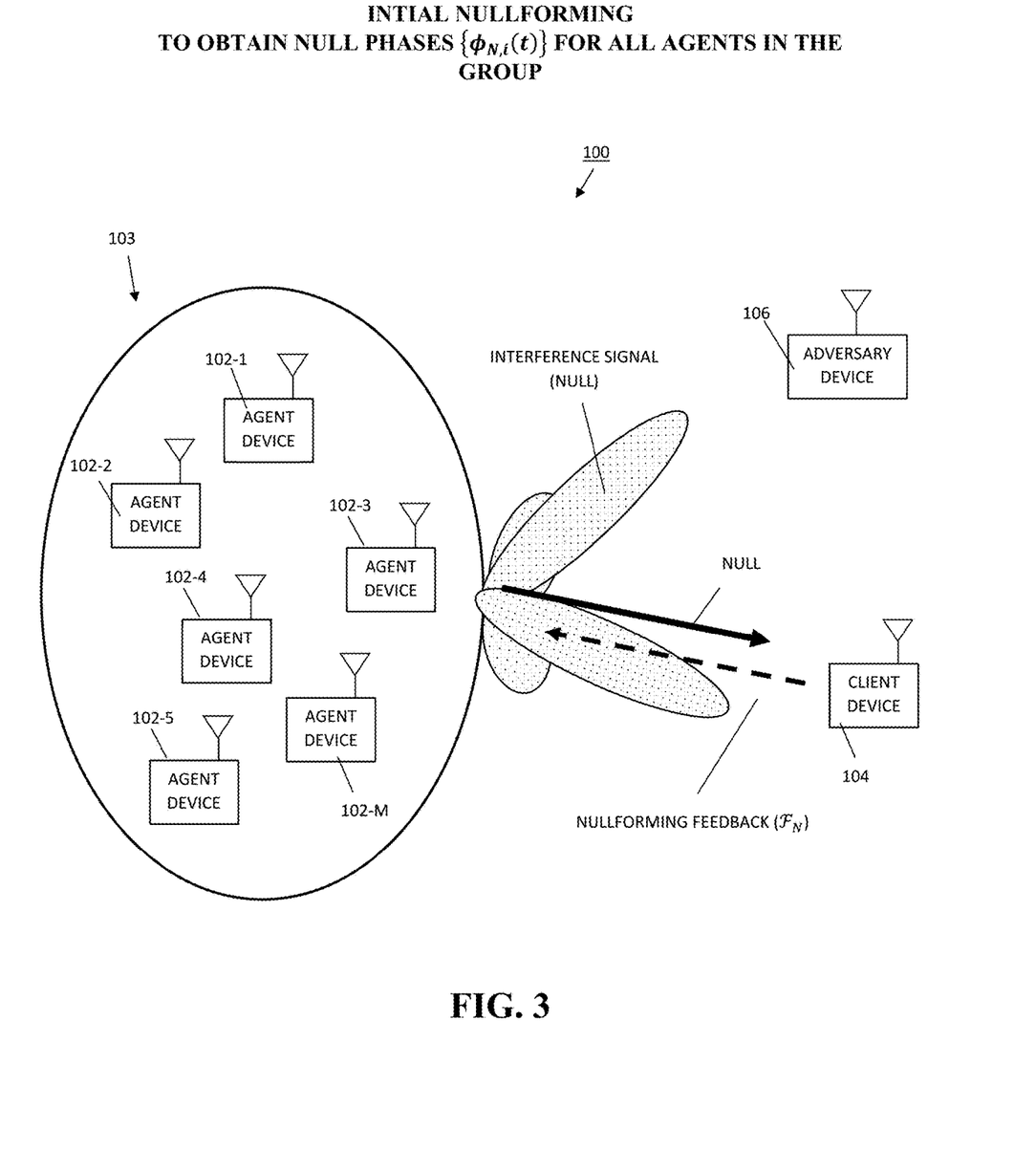
FIG. 3 depicts a block diagram of the network of FIG. 1 using the group of agents to initially form a null in the direction of the client in accordance with at least one embodiment.

FIGS. 3-6 show the network 100 of FIG. 1 used for the aforementioned steps of method 200. First, FIG. 3 depicts a block diagram of the network 100 of FIG. 1 forming a null in the direction of the client 104 using the group 103 of agent devices 102-1 to 102-M (circled) in the initial nullforming process 204 of method 200 in accordance with at least one embodiment. The operations executed here are detailed in Step 2 Nullforming in Pseudocode 1, above.

The nullforming pattern shown in the figure is not meant to depict any actual pattern. It is merely illustrative. There is no guarantee that the nullforming beam will be pointed in any specific direction. Indeed, it is more likely that it will be multiple beams in pointing in different directions from what is shown.

All agent devices 102-1 to 102-M of the group 103 are used together during the initial nullforming process 202. The null forming broadcasts artificial RF interference or noise. No beamforming is occurring at this time. As noted in Step 2 of Pseudocode 1, the client measures the received INR and transmits a feedback signal $\mathcal{F}_N$ to the agents such that the nullforming agents adjust their RF signal phase until the feedback indicates an acceptable level of noise signal is received, i.e., a minimal level of noise indicating the null is aligned with the client. When the initial nullforming process 204 is complete, then at 206 in method 200, the group 103 of agents 102-1 to 102-M in G update their phases with the goal of forming a beam that maximizes the SINR $\gamma_C(t)$.

Figure 4:
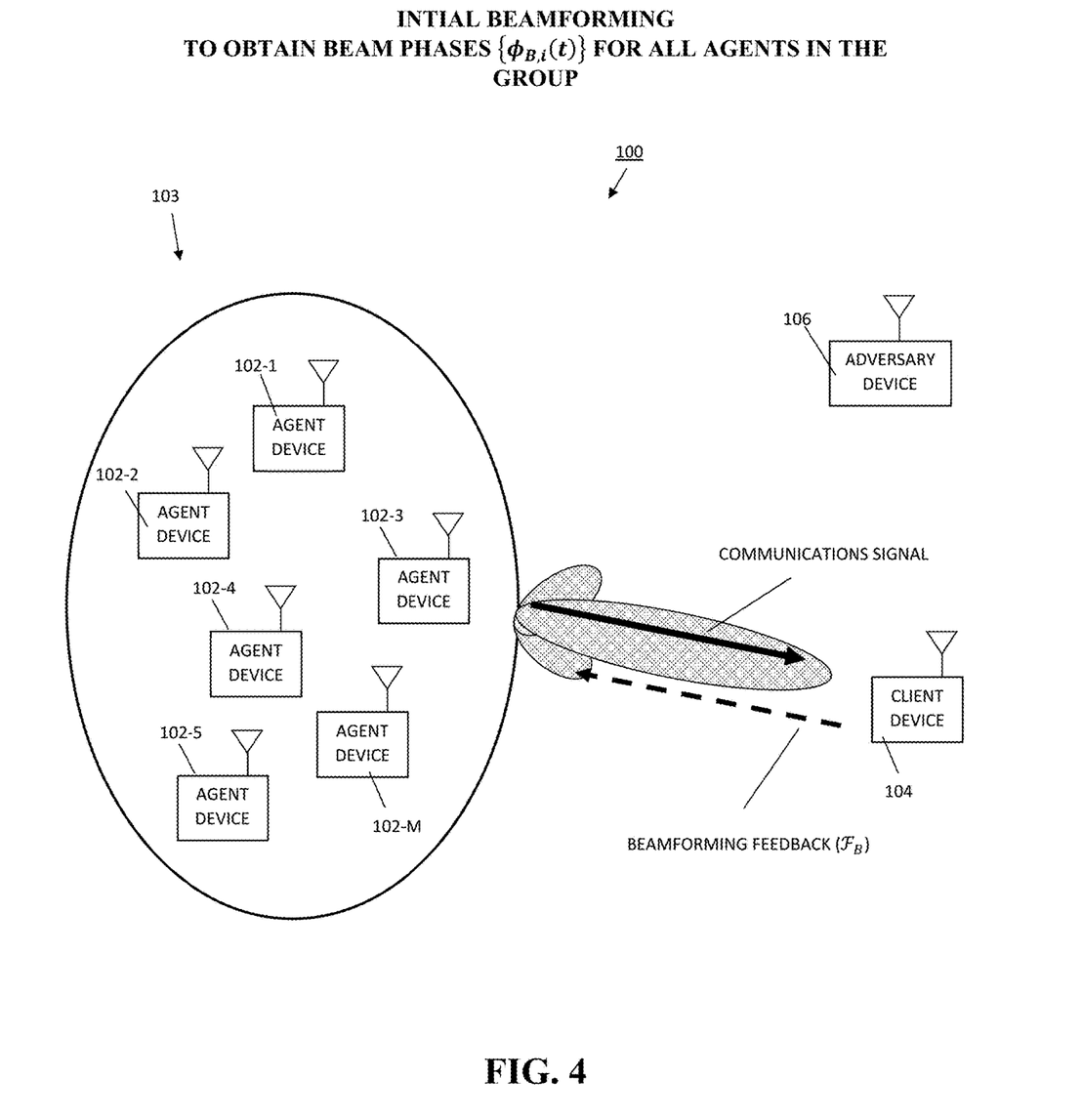
FIG. 4 depicts a block diagram of the network of FIG. 1 using the group of agents to initially form a communications signal beam in the direction of the client in accordance with at least one embodiment.

FIG. 4 depicts a block diagram of the network 100 of FIG. 1 forming a communications beam in the direction of the client 104 using the group 103 of agent devices 102-1 to 102-M (circled) in the initial beamforming process 206 of method 200 in accordance with at least one embodiment. The operations executed here are detailed in Step 3 Beamforming in Pseudocode 1, above. All agent devices 102-1 to 102-M of the group 103 are used together during the initial beamforming process 204. This process may use a test or "dummy" message as the communication signal. No nullforming is occurring at this time.

As with the beamforming process and as noted in Step 3 of Pseudocode 1, the client transmits a feedback signal $\mathcal{F}_B$ to inform the agents when an acceptable signal strength is being received. Until the received signal is acceptable, the agents periodically adjust the phase of the transmitted RF signal.

FIG. 5 depicts a block diagram of the network 100 of FIG. 1 using the group 103 of agent devices 102-1 to 102-M (circled) to perform the power allocation process 208 of method 200 in accordance with at least one embodiment. The operations executed here are detailed in Step 4 Power Allocation in Pseudocode 1, above. As noted above, process 208 is preferred but is not necessarily required for all embodiments and implementations.

The agents 102-1 to 102-M simultaneously perform nullforming and beamforming initially with the aim to quickly optimize and adjust the power between the two processes before continuing to 210. This process may use a test or "dummy" message as the communication signal. The power allocation process 208 is typically much quicker than the simultaneous nullforming and beamforming 210.

As further described below, the initial nullforming 204, initial beamforming 206, and power allocation 208 are performed in alternating time periods (time slots) and are iterative in nature. The specific feedback from the client to an agent, labelled $\mathcal{F}_N$ (nullforming feedback) in FIG. 3, $\mathcal{F}_B$ (beamforming feedback) in FIG. 4, $\mathcal{F}_A$ (power allocation feedback) in FIG. 5, includes 2 bits of feedback data. A communication message including the feedback may be sent from the client and received by one or more agents at each iteration. These processes are repeated until the QoS constraint of the client is satisfied or a predetermined number of iterations is achieved.

The feedback $\mathcal{F}$ is different for the initial nullforming 204, initial beamforming 206 and power allocation 208 processes. $\mathcal{F}_N$, $\mathcal{F}_B$ and $\mathcal{F}_A$ are sets containing three predetermined, two-bit informational messages, respectively, which may be used for feedback for nullforming, beamforming, and power allocation, respectively. The message from the client to the agent including feedback $\mathcal{F}$ may have three possible values, e.g., (0,0), (0,1) and (1,1). Each value may be a binary value, 0 or 1. Hence, the feedback $\mathcal{F}$ in the message is formed of two bits. It is noted that there is no specific meaning on the first and second numbers in each parenthesis of the parameters or the number of parameters in this exemplary set of values. Alternatively, embodiments could use other values and parameters as well as other items to represent data.

In the exemplary set of feedback $\mathcal{F}_N$ for the nullforming process, (0,0) and (0,1), respectively, indicate that the current INR is smaller and larger than the saved lowest INR. (1,1) is used to notify that the nullforming process is complete. In the set of feedback $\mathcal{F}_B$ for the beamforming process the values (0,0) and (0,1), respectively, may be used indicate that the current SINR is larger and smaller than the saved highest SINR. (1,1) is used to notify that the beamforming process is complete. Again, just one two-bit parameter of $\mathcal{F}_N$, $\mathcal{F}_B$ or $\mathcal{F}_A$ will be included in the feedback $\mathcal{F}$ in any one feedback communication from the client to the agent(s).

The client sends the feedback $\mathcal{F}$ wirelessly to an agent in a communication message including one of the three possible two-bit parameters from $\mathcal{F}_N$, $\mathcal{F}_B$ or $\mathcal{F}_A$. Upon receipt of the feedback communication from the client, the agent acts accordingly based on the predetermined two-bit data included in feedback $\mathcal{F}$ of that communication.

The initial nullforming 204 and initial beamforming 206 are iterative processes that occur at each time slot. The agent updates its phase components in response to the two bits of information received from the client based on the feedback $\mathcal{F}$ for initial nullforming 204 and initial beamforming 206. As an example, in time slot t, the nullforming phase components are adjusted by: $\phi_{N,i}(t) \leftarrow \phi_{N,i}(t-1) + \delta_i$, where $\delta_i$ is uniformly distributed on $[0, \Delta]$. For instance, $\Delta$ may be $$\frac{\pi}{5}$$

in one non-limiting example.

For initial nullforming sub-processing 204, the agent considers the Interference-to-noise ratio (TNR) at each iteration $\xi_C(t)$, and the iteration stops if $\xi_C(t) \leq \xi_C^{target}$ or the number of iterations reaches $N_N$. In one non-limiting example, $N_N$ may be 50. $\xi_C^{target}$ may be 0.001, for instance. $\xi_C^*$ represents the saved lowest computed $\xi_C(t)$ thus far. For the initial beamforming sub-processing 206, the iteration stops if $\gamma_C(t) \geq \zeta \gamma_C^{target}$ or the number of iterations reaches $N_B$. $\gamma_C^*$ represents the saved highest computed SINR thus far. In one non-limiting example, $N_B$ may be 50.

Figure 6:
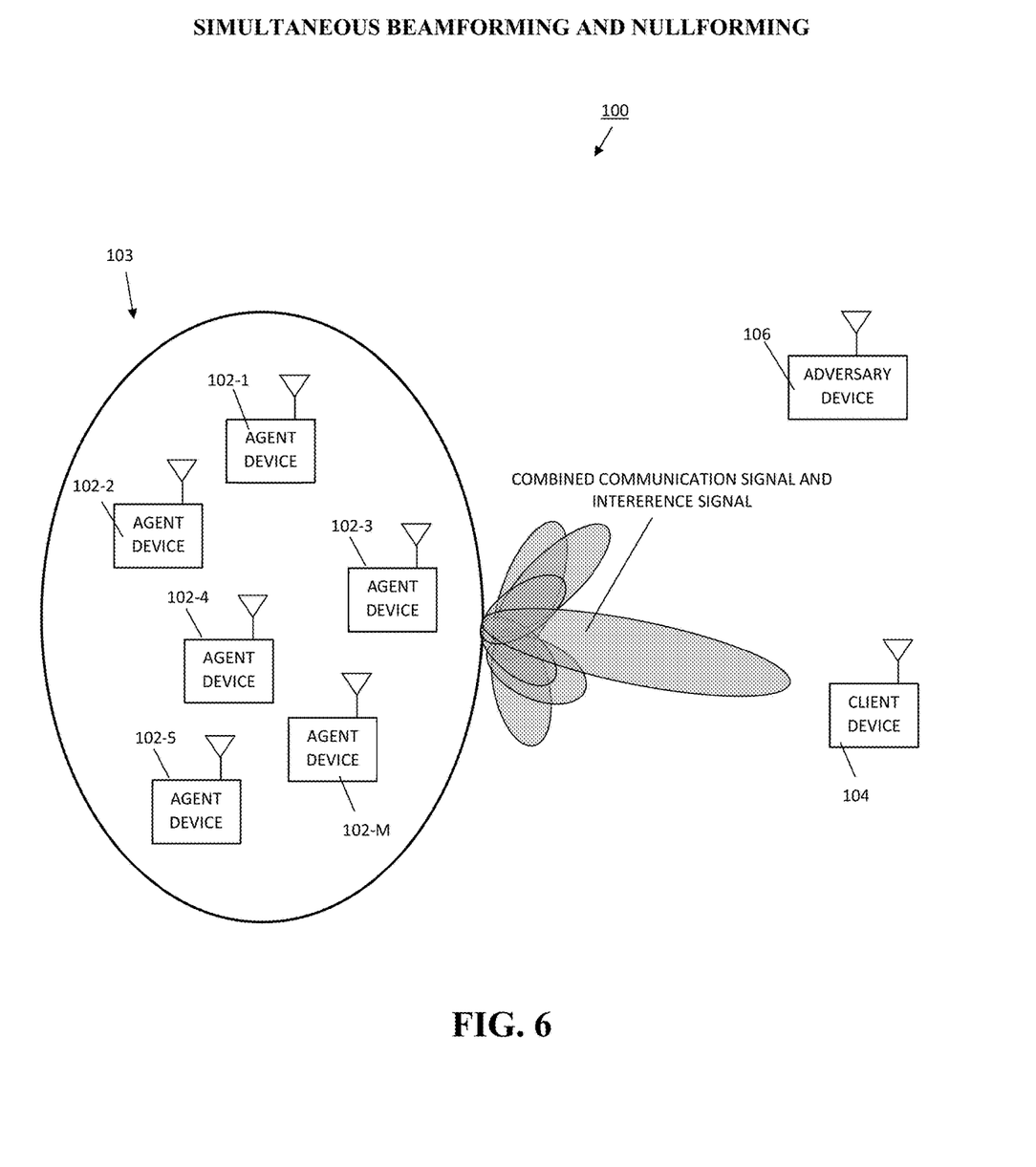
FIG. 6 depicts a block diagram of the network of FIG. 1 using the group of agents to perform simultaneous beamforming and nullforming in accordance with at least one embodiment.

FIG. 6 depicts a block diagram of the network 100 of FIG. 1 using the group 103 of agent devices 102-1 to 102-M (circled) to perform the simultaneous beamforming and nullforming process 210 of method 200 in accordance with at least one embodiment. This step sends a secure communication as the communication signal component of the combined communication signal and interference signal. The phases and power allocation used here were determined in the earlier processes 204, 206 and 208.

The agents all use the same communication signal here. A combined communication signal and communication signal interference to the client may be sent from the agents to the client intermittently or continuously. The communication signal portion of the combined RF sent by the agents 102-1 to 102-M can change in 210, as may be desired or otherwise needed.

Figure 7:
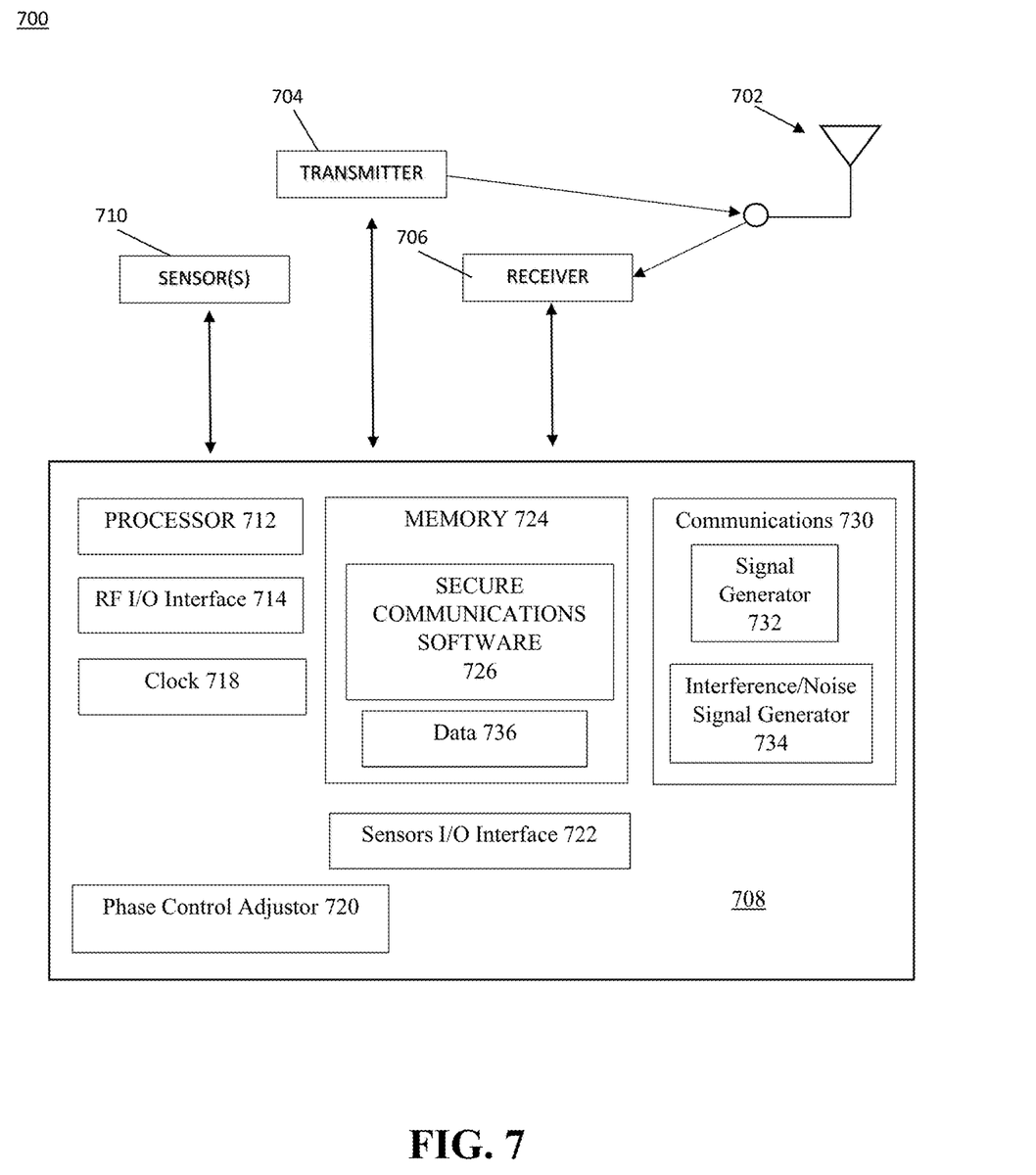
FIG. 7 depicts a simplified high-level block diagram of an exemplary transceiver for an agent or a client in accordance with at least one embodiment.

FIG. 7 depicts a simplified high-level block diagram of an exemplary transceiver 700 for an agent (i.e., 102-1 to 102-M in FIGS. 1 and 3-6) in accordance with at least one embodiment. In some embodiments, the client (104 in FIGS. 1 and 3-6) may also include this form of transceiver. The transceiver 700 comprises an antenna 702, an RF transmitter 704, an RF receiver 706, a controller 708 and, optionally, one or more sensors 710. In one embodiment, the transceiver 700 may be specifically configured to execute secure communications software 726 comprising the pseudocode (Pseudocode 1) to perform the method 200 of FIG. 2 as described above.

In one embodiment, the transmitter 704 is a conventional RF transmitter that is controlled by the controller 708. The transmitter 704 is capable of having the phase of the transmitted signal adjusted by the controller 708 such that the beam and/or null may be appropriately directed. An omni-directional antenna may be preferred. When transceiver 700 is used as a portion of a client device, the transmitter 704 transmits data including the feedback bits $\mathcal{F}$ (i.e., $\mathcal{F}_N$, $\mathcal{F}_B$ or $\mathcal{F}_A$).

In one embodiment, the receiver 706 is a conventional RF receiver that is controlled by the controller 708. When operating as an agent, the receiver 706 receives communications signals from a client including the feedback bits F and couples the data and feedback bits to the controller for processing. When the transceiver 700 is a portion of a client, the receiver 706 receives the signals from the agents to facilitate forming a null or beam as described above.

The optional sensors 710 may include one or more of cameras, microphones, multispectral imaging (UV/visible/IR) sensors; antennas (RF; radio); ranging (radar; LIDAR) sensors; location/position sensors (GPS, altitude/depth, etc.), motion sensors (speed/velocity, bearing/trajectory, acceleration, etc.); weather sensors (temperature, pressure, wind speed, ambient lighting, etc.); field sensors (electric, magnetic, vibrations, radiation, biological, etc.) and the like. The signals to/from these sensors 710 are processed by the controller 708 and may be used locally or transmitted to the client from an agent or to an agent from a client.

In one embodiment, the controller 708 comprises processor(s) 712, memory 724 and various support sub-systems and circuits such as, but not limited to, an RF input/output (I/O) interface 714, a clock 718, a phase control adjustor 720, a sensor(s) I/O interface 722, and a communications module 730. The RF input/output (I/O) interface 714 communicates with the RF hardware (e.g., receiver 706 and transmitter 704) so as to control the transmission/receptions of radio signals for communications and beamforming. It includes frequency synchronization configured to carry out the simultaneous beamforming and nullforming methodology including handling both the transmission and feedback signals in a manner to support the processing discussed above. The sensor(s) I/O interface 722 communicates with any sensor(s) which the agent or client may be equipped. The clock 718 is used for timing and establishing time slots to facilitate alternating and iterative utilization of beamforming and/or nullforming processes. In one embodiment, the clock of each agent may be calibrated ahead of time such that all agents' clocks are substantially correlated. The clocks may also be synchronized to an external source such a satellite navigation system (e.g., the global Positioning System (GPS)). In other embodiments, an agent could interface with the client (or another entity) for clock calibration. The communications module 730 generate signals for communications, including a RF communications signal generator 732 and an RF interference/noise generator 734 to be used for beamforming and/or nullforming. The module 730 may be capable of handling analog or digital signals, the later including packetized data. If desired, the signal generator 732 may provide encryption for provided confidential signals as known in the art.

In one embodiment, the controller 708 includes a processor 712 coupled to a memory 724. The processor 712 may be one or more of, or combinations thereof, microprocessors, microcontrollers, application specific integrated circuits (ASICs), and/or the like. The memory 724 may be any form of read only memory, random access memory or combinations thereof. In an embodiment, the memory 724 is a non-transitory computer readable media that stores secure communications software 726 and data 736 such that the processor(s) 712 of agents 102-1 to 102-M may execute the software 726 to implement the method 200 of FIG. 2 to perform beamforming and/or nullforming in accordance with embodiments of the invention described above. Portions of the method 200 are appropriately performed by a controller 708 in the client and agent as described above. The data 736 may include communications data, control data and feedback data.

From numerical simulations, embodiments of the simultaneous beamforming and nullforming methodology substantially improves secure communications between agents and clients as well as suppresses the ability of adversaries to intercept the communications signals. In one example, when the client SINR is equal to 24 dB, the SINR at an adversary may be decreased by 10 dB when compared to the conventional methodology that does not consider the presence of potential adversaries.

The aforementioned technology can be utilized for wireless networks where multiple geometrically distributed transmitters send a confidential message to an intended receiver. More specifically, the technology is suitable for any network where there are security threats, coordination among the transmitters is restricted or feedback from the client receiver is limited.

Also, the distributed beamforming and nullforming methodology can be applied to networks with autonomous mobile agents that coordinate antenna element radiation to establish a communication link to a client, e.g., soldier, first responder or another autonomous agent. It may be implemented in environments such as underground tunnels and dense forests are austere, highly dynamic and infrastructure-poor, e.g., Global Positioning System (GPS)-denied and limited finite-rate feedback information from the client. In addition, the distributed beamforming techniques should provide security to prevent malicious eavesdroppers from intercepting confidential messages in the battlefield or wireless commercial networks. The technology proposes a simultaneous beamforming and nullforming technique that establishes a secure communication link/channel between the agents and client with a low feedback burden (for example, two bits) and without any required information about potential malicious adversaries.

Potential commercial uses of embodiments of the invention include data transmission in wireless sensor networks where multiple distributed sensor nodes send collected data to a gateway. By using the technology, geometrically separated sensor nodes can securely transmit confidential messages to the gateway based on, for example, two bits of feedback information from the gateway without coordination among the sensor nodes. The technology is scalable in terms of the number of transmitters (sensors), and hence it can be applied to the networks with a large number of sensors.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

The terms "broadcast/broadcasting" and "transmit/transmitting" are used herein. Both are used to refer to the sending of RF signals. The former tend to suggest a larger or broader coverage range for the RF signals, for instance, going in many directions, while the latter suggest a more targeted RF signal going in one direction primarily.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

We claim:

1. A system for distributed wireless communications comprising:
   a plurality of agents, which together as the group, are configured to:
   (i) wirelessly broadcast an interference signal by forming a radiation pattern having null vectored substantially toward a client;
   (ii) wirelessly transmit a communication signal to the client by forming a radiation beam carrying the communication signal vectored substantially toward the client; and
   (iii) wirelessly broadcast a combined communication signal and interference signal to the client using phases of processes (i) and (ii).

2. The system of claim 1, wherein, to perform process (i), the agents together as the group are configured to adjust phases of the transmitted interference signals resulting in the interference signal transmitted by the agents in the group cancelling each other at the client.

3. The system of claim 2, wherein the agents receive at least one client communication signal transmitted from the client comprising feedback information based on the client's received interference-to-noise-ratio (INR), and in response, the agents adjust the phases of the interference signals.

4. The system of claim 3, wherein, the agents repeat phase adjustments until a Quality of Service (QoS) constraint of the client is satisfied or achieving a predetermined number of adjusting iterations.

5. The system of claim 1, wherein, to perform process (ii), the agents together as the group are configured to adjust phases of the transmitted communication signals resulting in the communication signal transmitted by the agents in the group constructively combining at the client.

6. The system of claim 5, wherein the agents receive at least one client communication signal transmitted from the client comprising feedback information based on the client's received signal-to-interference-plus-noise-ratio (SINR) or signal-to-noise-ratio (SNR) and, in response, the agents adjust the phases of the transmitted communication signals.

7. The system of claim 6, wherein the agents repeat phase adjustments until a Quality of Service (QoS) constraint of the client is satisfied or achieving a predetermined number of adjusting iterations.

8. The system of claim 1, wherein the agents together as a group are configured to: allocate and adjust power for performing processes (i) and (ii) at substantially the same time.

9. The system of claim 8, wherein the agents receive at least one client communication signal transmitted from the client comprising feedback information based on the client's received signal-to-interference-plus-noise-ratio (SINR) and, in response, the agents adjust the power allocated for performing processes (i) and (ii).

10. The system of claim 9, wherein the agents determine a value of power allocation that fulfills a Quality of Service (QoS) constraint of the client.

11. The system of claim 10, wherein the determination is made using a bisection method.

12. The system of claim 1, further comprising the client.

13. The system of claim 12, wherein the client sends a client communication signal to the agents of the group comprising feedback information based on the client's received signal-to-interference-plus-noise-ratio (SINR), signal-to-noise ratio (SNR), or interference-to-noise-ratio (INR).

14. The system of claim 13, wherein the feedback information sent by the client comprises two bits.

15. A method for performing distributed wireless communications comprising:
(i) wirelessly broadcasting by a group of agents an interference signal by forming a radiation pattern having null vectored substantially toward a client;
(ii) wirelessly transmitting by the group of agent a communication signal to the client by forming a radiation beam carrying the communication signal vectored substantially toward the client; and
(iii) wirelessly broadcasting by the group of agents a combined communication signal and interference signal to the client using phases of processes (i) and (ii).

16. The method of claim 15, wherein, performing process (i) comprises: the agents together as the group receiving at least one client communication signal transmitted from the client comprising feedback information based on the client's received interference-to-noise-ratio (INR), and in response, the agents adjust phases of the interference signals.

17. The method of claim 16, wherein, performing process (i) comprises: the agents receiving at least one client communication signal transmitted from the client comprising feedback information based on the client's received interference-to-noise-ratio (INR), and in response, the agents adjusting the phases of the interference signals.

18. The method of claim 17, wherein, performing process (i) comprises: the agents repeating phase adjustments until a Quality of Service (QoS) constraint of the client is satisfied or achieving a predetermined number of adjusting iterations.

19. The method of claim 15, wherein, performing process (ii) comprises: the agents together as the group adjusting phases of the transmitted communication resulting in the communication signals transmitted by the agents in the group constructively combining at the client.

20. The method of claim 19, wherein, performing process (ii) comprises: the agents receiving at least one client communication signal transmitted from the client comprising feedback information based on the client's received signal-to-interference-plus-noise-ratio (SINR) or signal-to-noise-ratio (SNR) and, in response, the agents adjusting the phases of the transmitted communications signals.

21. The method of claim 20, wherein, performing process (ii) comprises: the agents repeating phase adjustments until a Quality of Service (QoS) constraint of the client is satisfied or achieving a predetermined number of adjusting iterations.

22. The method of claim 15, further comprising: the agents together as a group allocating and adjusting power for performing processes (i) and (ii) at substantially the same time.

23. The method of claim 22, further comprising: the agents receiving at least one client communication signal transmitted from the client comprising feedback information based on the client's received signal-to-interference-plus-noise-ratio (SINR) and, in response, the agents adjusting the power allocated for performing processes (i) and (ii).

24. The method of claim 23, further comprising: the agents determining a value of power allocation that fulfills a Quality of Service (QoS) constraint of the client.

25. The system of claim 24, further comprising: determination of the value of power allocation using a bisection method.

26. The method of claim 25, further comprising: the client sending a client communication signal to the agents of the group comprising feedback information based on the client's received signal-to-interference-plus-noise-ratio (SINR), signal-to-noise ratio (SNR), or interference-to-noise-ratio (INR).

27. The method of claim 26, wherein the feedback information sent by the client comprises two bits.

28. A non-transitory computer storage medium comprising computer-executable instructions that, when executed by one or more processors residing in a group of agents, configure the group of agents to execute the method of claim 15.

* * * * *